Aug. 14, 1956  M. LEDOS  2,758,376
APPARATUS FOR MEASURING THE HUMAN FOOT
Filed June 29, 1955  4 Sheets-Sheet 1

Inventor
M. Ledos
By Glascock Downing Seebold
Attys.

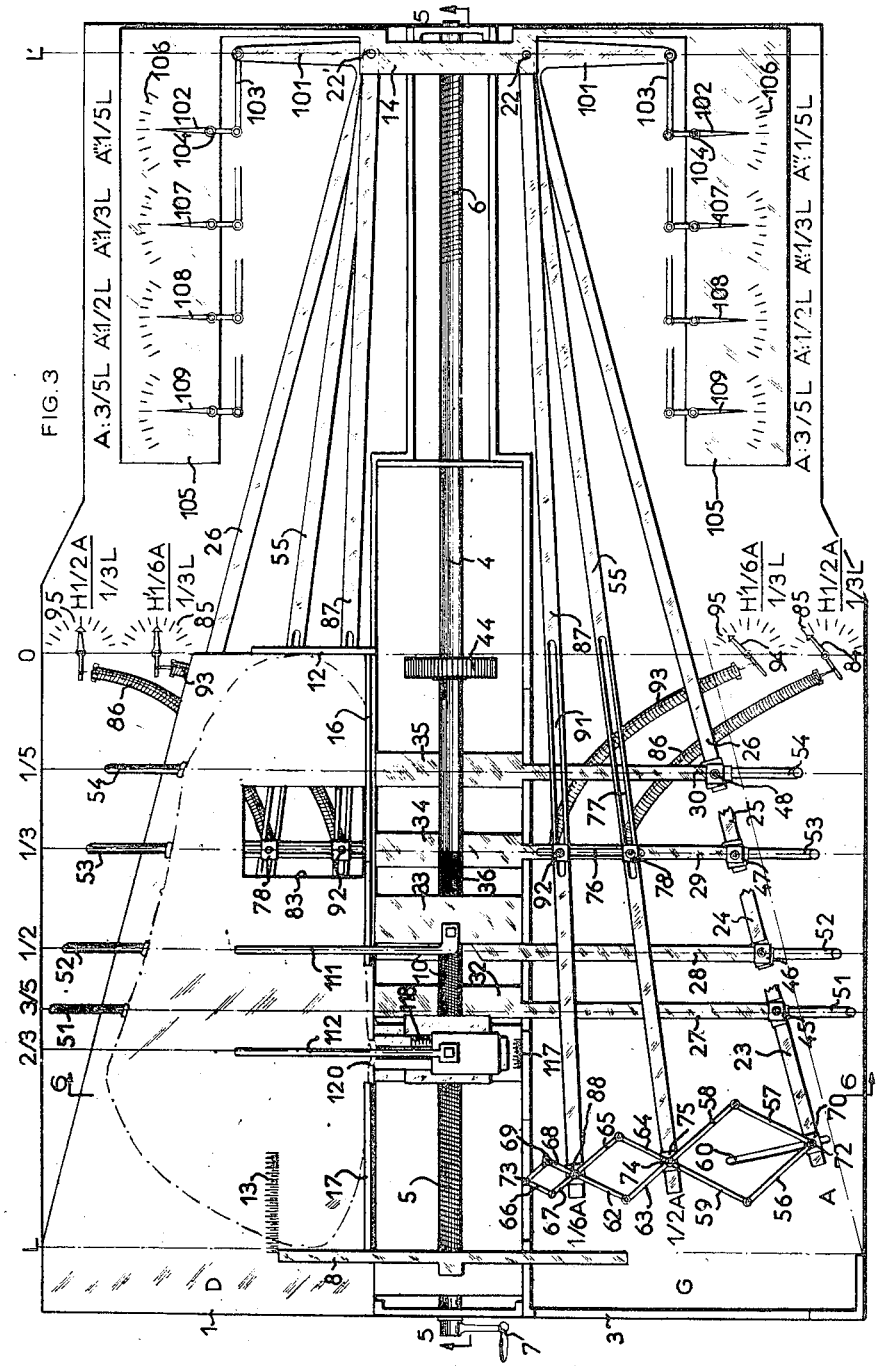

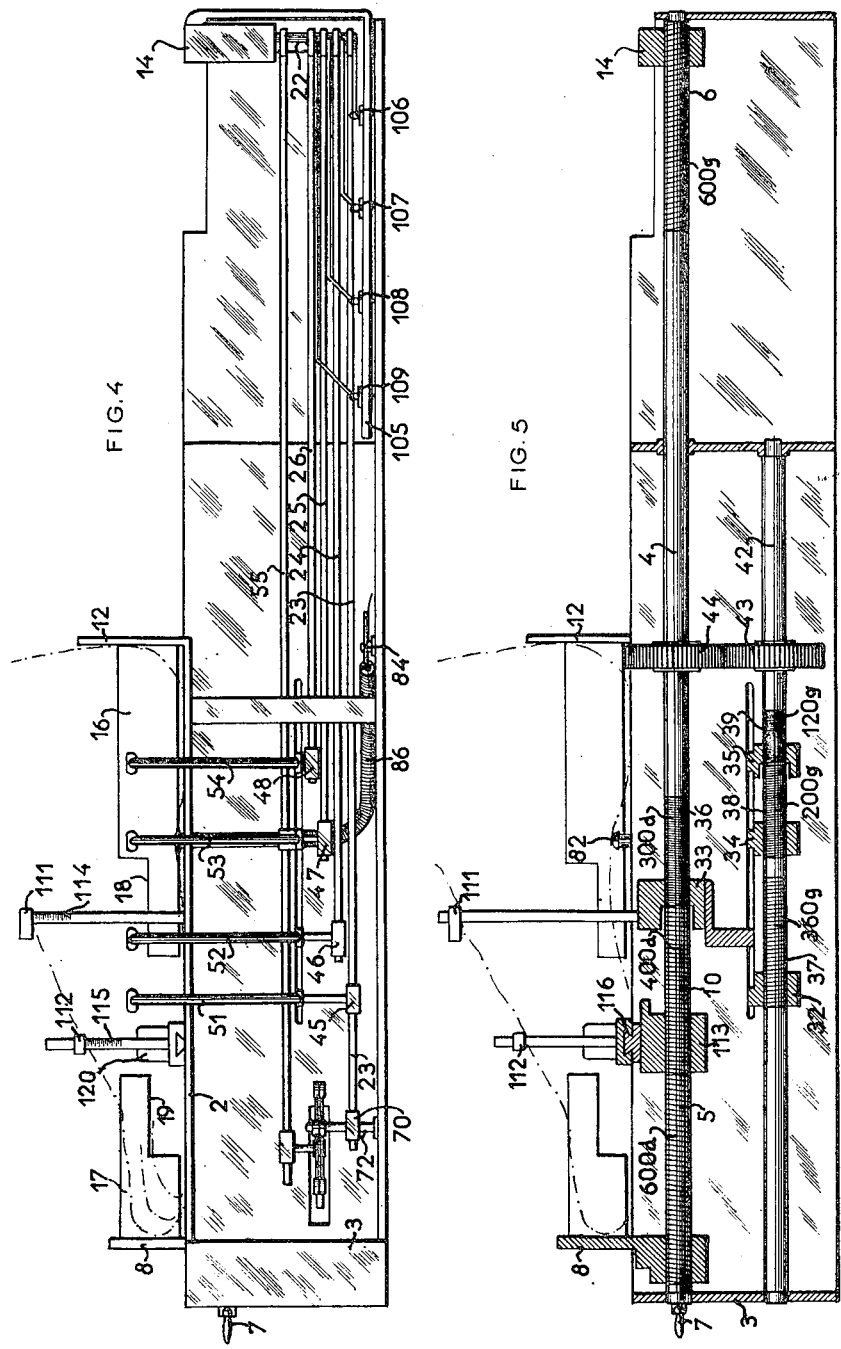

Aug. 14, 1956    M. LEDOS    2,758,376
APPARATUS FOR MEASURING THE HUMAN FOOT
Filed June 29, 1955    4 Sheets-Sheet 4

Inventor
M. Ledos
By Glascock Downing Seebold
Attys.

United States Patent Office 2,758,376
Patented Aug. 14, 1956

2,758,376

APPARATUS FOR MEASURING THE HUMAN FOOT

Maurice Ledos, Paris, France

Application June 29, 1955, Serial No. 518,903

12 Claims. (Cl. 33—3)

The invention relates to an improved apparatus for the measurement of human feet.

Up to the present time, for measuring feet, only very elementary kinds of apparatus were available such as apparatus of the kind known as caliper slide-gauges or apparatus derived from such instruments and comprising a plate provided with two cursors arranged flat on the plate in two perpendicular directions. With apparatus of this kind, only the total length of the foot and its maximum width (coarsely at the level of the metatarsal heads) were measured.

Such apparatus is quite primitive and inadequate since it gives by direct reading only one measurement or at the most two measurements, namely the length of the foot and the maximum width of the foot (coarsely at the level of the metatarsal heads); in addition, this last measurement is frequently rendered inaccurate by the presence of the hallux valgus which considerably increases the width of the foot at this point, and does not give any indication of the differential proportions of the width, so that, if account is taken only of the length of the foot and its maximum width at this point, in the manufacture or the choice of a shoe intended to fit a given foot, it will well be understood that in practice the shoe cannot be suitably adapted to the foot for which it is intended.

The invention has for its purpose to satisfy this need by means of an improved apparatus which enables simultaneous measurement to be made, not only of the width of the foot at a number of important points of its anatomy, but also the height of important points on its upper face and on the arch of the foot.

These points on the anatomy of the foot which have been referred to as important have already been determined with the greatest care by the present applicant during the course of previous and very extensive researches. It was found during these researches that, in plan, the foot is always contained in a rectangular trapezium, of which the angle $\alpha$ of the two non-parallel sides is, except in really exceptional cases, included between 11 grades and 15 grades for adults (see Figure 1). This angle may attain 17 grades in the case of small children. In addition, the height of this trapezium is equal to half the corresponding height of the triangle in which the trapezium is formed. Further, the upper face of the foot forms, with the lower face, an angle $2\alpha$ which is twice the angle previously referred to.

Starting from the rear face of the heel, it is found that the point of support of the heel on the ground is located in the axis of the foot at the rear fifth on the length L of the foot, that is to say at the point of support of the base of the calcaneum; that the highest point of the arch of the foot is located at a distance from said heel rear face approximately equal to one-third of the length L; that the highest point of the upper surface of the foot (the first cuneiform bone, a particularly sensitive point) is located at a distance approximately equal to half the length L; that the internal lateral protuberance of the hallux valgus is located at a distance comprised approximately between two-thirds and three-quarters of the length L. This point corresponds furthermore to the metatarso-phalangeal joint of the big toe, the joints of all the metatarsals being furthermore arranged in an arc of a circle and the metatarsal-phalangeal joint of the fifth toe being located at a distance from the rear face of the heel, which is approximately equal to three-fifths of the length L of the foot.

In addition, if the plan view of the foot is considered, it is found that the vertical plane passing through the bisector of the angle $\alpha$ contains the point M which is the most important point of the arch of the foot (the key of the arch). A further important point of the arch of the foot is also the point shown at N, which is located in the vertical plane passing through the axis of the big toe, that is to say the plane which makes an angle with the plane of the internal face of the foot which approximately equal to one-sixth of the angle $\alpha$.

It is also an advantage to know the width of the foot at one-fifth of its length from the rear face of the heel, since this width corresponds to the widest portion of the heel, and to the axis of bending of the foot on the leg; the width of the foot at one-third of its length and which corresponds to a concave portion of the external face of the foot; and the width of the foot at half and at three-fifths of its length.

The invention has for its object an apparatus by means of which the positions of the points as well as the values of the various mentioned dimensions referred to above may be determined in the form of precise measurements.

This apparatus automatically takes account of the fact that the linear and angular proportions referred to above are always respected, apart from a few rare exceptions. It comprises a set of pivoted bars, the pivotal point of which may be brought to a distance from the rear face of the heel equal to the length of the foot and which corresponds to the apex of the angle in which the foot is contained. Each of these bars carries a sliding feeler the position of which is determined by a device which ensures the proportionality of the lengths referred to, the said sliding feelers being arranged to be applied in contact with the corresponding points of the external face of the foot so that the angular position of the said bars gives an indication of the width of the foot at the corresponding points, and, in consequence, the relation between these widths.

The invention will be better understood with reference to the description which follows and by a study of the attached drawings which show by way of example, and not in any sense of limitation, one form of embodiment of the invention. In these drawings:

Figure 3 is a plan view of the apparatus in accordance with the invention, which enables an instantaneous reading to be obtained of all the important dimensions of the foot.

Figure 4 is a profile view of the appartus.

Figure 5 is a cross-section taken along the line 5—5 of Figure 3.

Figures 1, 2:
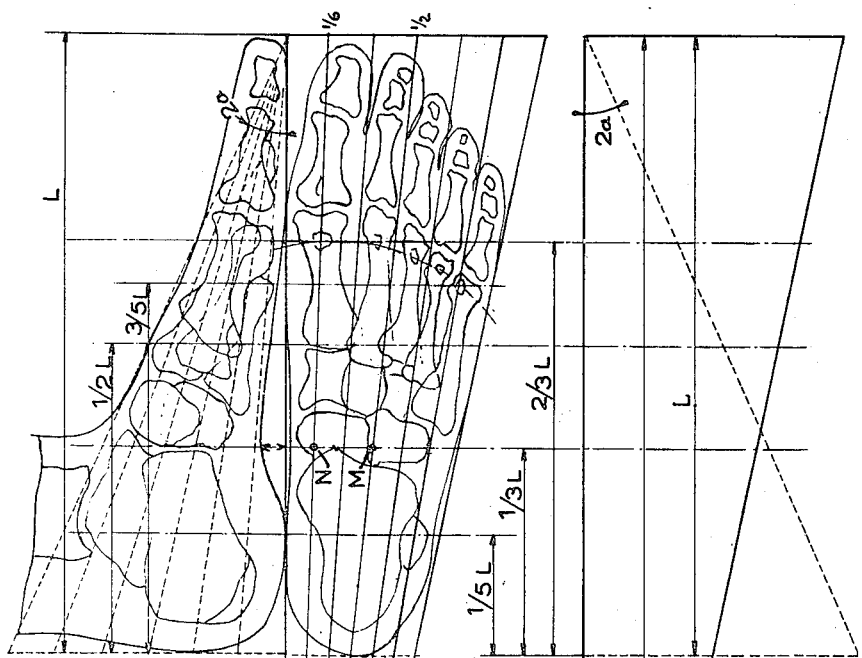
Figures 1 and 2 show the geometry of the foot as a whole and in its essential elements.

If reference is now made to Figure 3, the apparatus in accordance with the invention is shown in plan, this apparatus enabling simultaneous measurement to be made of the right foot and the left foot of a person and having for that reason a longitudinal plane of symmetry. At each side of this plane of symmetry are located two plates 1 and 2 (see Figure 4) which are respectively intended to receive the right and the left foot and which are supported by a base member 3.

The members which are disposed on one side only of the said plane of symmetry will now be described in detail it being understood that symmetrically arranged members are provided on the other side of the apparatus.

In addition, in the vertical plane of symmetry, there is arranged a main threaded adjustment rod 4 provided at its two extremities with two threaded portions of which one, the portion 5, is threaded with a left-hand thread having a pitch $p$ and the other, the portion 6, is threaded right-hand with a thread of the same pitch $p$. The threaded rod 4 is pivotally-mounted at its two extremities in the base 3 and it may be rotated by means of a control crank-handle 7.

Figure 6:
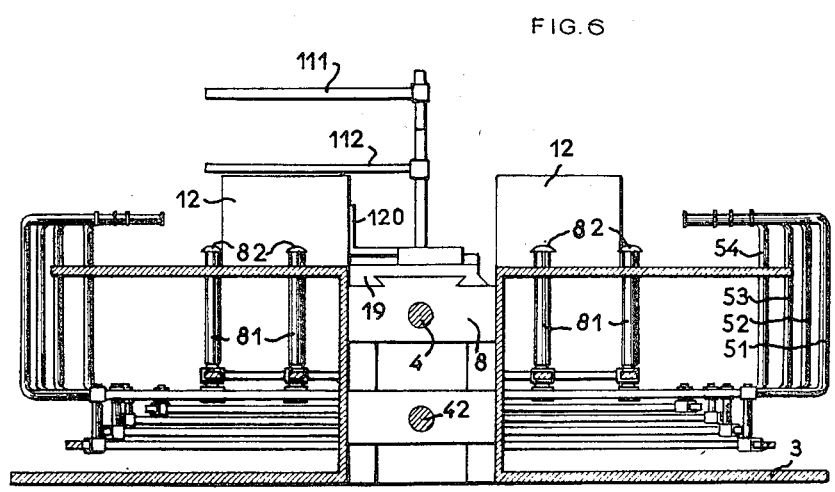
Figure 6 is a cross-section following the line 6—6 of Figure 3.

On the threaded portion 5 is engaged the inner threading of a cursor 8 (see also Figures 5 and 6) which is slidably mounted in a dove-tail slide 9 fixed to the base of the apparatus.

The plate 1 is provided with a raised edge 12 against which the person places the rear face of his heel. The slider 8 moves in front of a graduated scale 13 so that by turning the crank-handle 7, the cursor 8 may be brought into contact with the front extremity of the foot, thereby giving a measurement of the length L of the foot. Since the two ends of the threaded rod have threads of opposite direction and of the same pitch, the rear face of the heel is always located at an equal distance from the cursor 8 and from a further cursor 14 which is in screw engagement with the threaded part 6 of the rod 4 and which may also slide longitudinally along the apparatus.

The plate 1 has a further raised edge 16, parallel to the plane of symmetry of the apparatus and acting as a supporting surface for the internal face of the foot. A small vertical plate 17 located in the same plane as the raised edge 16 is rigidly fixed to the cursor 8 and extends the edge 16 in the front part of the apparatus. The raised edge 16 and the small plate 17 are provided with notches 18 and 19 respectively which enable the continuity of the lateral supporting face constituted by them to be ensured in spite of the mobile nature of the small plate 17. The cursor 14 has two spindles 22, 22'. The spindle 22' is arranged approximately in the extension of the raised edge 16 and the spindle 22 is symmetrical with the spindle 22' with respect to the central plane of the apparatus. On the spindle 22 are pivotally-mounted four superposed bars 23, 24, 25 and 26 (see Figures 3, 4 and 6).

In addition, four cross members 27, 28, 29, 30 are fixed respectively to four cursors 32, 33, 34, 35. The cursor 33 is engaged on a threaded part 36 of the rod 4, the pitch of which is equal to $p/2$, that is to say half the pitch of the threaded part 5 on which the end cursor 8 is engaged. Whatever angle the rod 4 may be turned through, provided that a selected reference point on the cursor 33 has been initially located at a distance from the rear face of the heel of the foot being examined, equal to half the distance L which separates the rear face of the cursor 8 from the front face of the raised edge 12, the same relationship will be preserved.

The three other cursors 32, 34 and 35 are respectively engaged on the threaded parts 37, 38 and 39 of an auxiliary rod 42 which is pivotally mounted at its extremities on the base of the apparatus, and which is coupled for rotation to the main rod 4 through the medium of two equal toothed wheels 43, 44, one of which is keyed on the rod 42 and the other on the rod 4. Since this coupling causes the rod 42 to turn in the opposite direction to the sense of rotation of the rod 4, the threads of the threaded parts 37, 38, 39 of the rod 42 are right-hand threads whilst the threads of the parts 5 and 36 of the rod 4 are left-hand threads, in order that all the cursors driven by the said threaded parts may move in the same direction when the operating handle 7 is actuated.

The pitches of the threaded parts 37, 38 and 39 are respectively $3p/5$, $p/3$ and $p/5$, so that reference points of the cursors 32, 34 and 35 may be respectively located at distances from the front face of the raised edge 12 equal to $3/5$, $1/3$ and $1/5$ of the distance L which has been defined above.

By way of example and without any implied restriction, the different screws may be given the following values of pitch:

| Screw | 5 | 6 | 36 | 37 | 3 | 39 |
|---|---|---|---|---|---|---|
| Pitch | 600 | 600 | 300 | 360 | 200 | 120 |

(The pitch values have been given in hundredths of millimetres.)

A swivel 45 slides at the same time along the rod 23 and on the cross member 27. In a similar way, three other swivels 46, 47 and 48 slide respectively along the bar 24 and the cross member 28, on the bar 25 and the cross member 29, and finally on the bar 26 and the cross member 30.

On the swivels 45, 46, 47, 48 are fixed feelers 51, 52, 53 and 54 which are doubly curved (see Figure 6) so as to avoid the edge of the plate 1 and thus come into contact with the external face of the foot to be measured (Figure 3).

The bar 23 is rigidly fixed to a lever 101 which is coupled to a pointer 102 through the intermediary of a connecting rod 103. The pointer 102 is pivotally mounted on a spindle 104 mounted on a support 105 rigidly fixed to the cursor 14. A graduated scale 106 engraved on the support 105 enables the deflection of the pointer 102 to be noted and, in consequence, the angular position of the bar 23 which corresponds to the value of the angle $\alpha$. The three other end bars 24, 25, 26 are connected respectively in a similar manner to three pointers 107, 108, 109.

It will be noted that, when the crank-handle 7 is turned, the cursor 14 is displaced together with other members and, in consequence, the pivotal axis 22 of all the longitudinal bars is also displaced. During the course of this movement, the bars 23, 24, 25 and 26 slide respectively in the swivels 45, 46, 47 and 48; in addition, the bar 23 also slides in the swivel 70 which is radially retained by the circular slot 60 formed in the plate of the apparatus. The bar 55 slides on the swivel 78 and in the swivel 75 of the pantograph, whilst the bar 87 slides on the swivel 92 and in the swivel 88 of the pantograph.

It has already been seen with reference to Figure 1 that it is also important to know the point M which is the point corresponding to the key of the arch of the foot. This point is located in the vertical plane which bisects the angle $\alpha$. In order to obtain this point, a further bar 55 (see Figure 3) has been provided, this bar also being pivoted upon the spindle 22 of the cursor 14. This bar 55 is constantly retained on the bisector of the angle formed by the bar 23 and is parallel to the threaded rod 4 which passes through the axis 22, by means of a pantograph, one half of which is formed by a lozenge composed of four pivoted rods 56, 57, 58 and 59, and the other half of which is constituted, for reasons which will be given later, by two other unequal lozenges, the first of which is formed by four rods 62, 63, 64 and 65, and the second by four shorter rods 66, 67, 68 and 69. The common point of articulation of the two rods 56 and 57 of the first half of the pantograph is located on a spindle 72 which is rigidly fixed to a cursor 70 adapted to slide on the bar 23, and the common point of articulation of the two rods 66 and 69 of the small lozenge of the second half of the pantograph pivots about a spindle 73 which is rigidly fixed to the casing 3 of the apparatus. The rods 63 and 64 of the second half of the pantograph are respectively fixed to the rods 58 and 59 of the first half of the pantograph, and are disposed in the extension of these latter; whilst the rods 67 and 68 are respectively fixed in a similar way to the rods 65 and 62 and are also arranged as their extensions. The common point of articulation of the rods 58, 59, 63 and 64 is located on an axis 74 fixed to a cursor 75 arranged to slide on the extremity of the bar 55. The three spindles 72, 75 and 73 are always in a straight line and the dimensions of the various rods of the pantograph are so chosen that the spindle 74 is located at equal distances from the two spindles 72 and 73. The result is that the bar 55 is always situated on the bisector of the angle α previously referred to, whatever may be the angular position of the bar 23.

Figure 7:
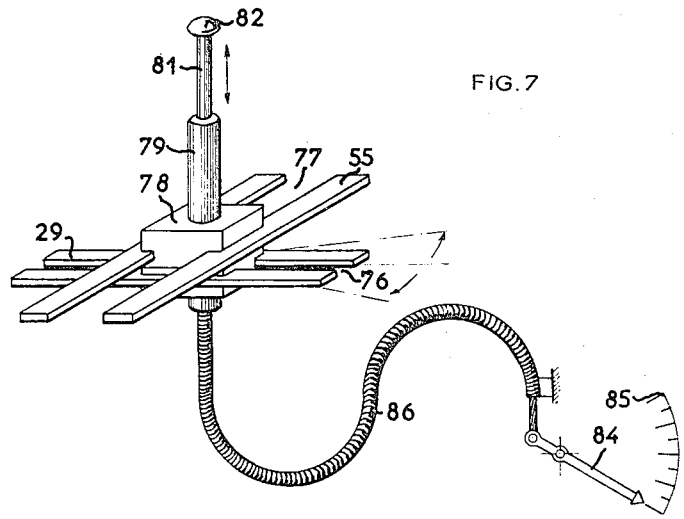
Figure 7 shows in perspective the assembly of one of the devices which enable the height of the arch of the foot to be measured at a number of points.

The point M, which has been referred to above with reference to Figure 1, is thus located above the bar 55 and it has been seen that it must at the same time be located at a distance from the rear face of the foot equal to one-third of the total length L of the foot. For this reason, there has been provided in the arm 29 rigidly fixed to the cursor 34 which corresponds to L/3, a longitudinal slot 76 and, in the bar 55, a longitudinal slot 77 in which is arranged to slide a swivel 78 (see also Figure 7). The swivel 78 corresponds to the point of intersection of the bar 55 and the arm 29 and is always situated at the same time on the bisector of the angle α already referred to and at a distance L/3 from the heel. The swivel 78 carries a vertical tube 79 (see Figure 7) in which slides a rod 81 which is terminated at its upper part by a rounded head 82 and is constantly pushed upwards by a spring (not shown). The rod 81 passes through a rectangular opening 83 (see Figure 3) formed in the plate 1 and it is coupled at its lower part to an indicating pointer 84 through the medium of a control of any kind, such as for example by a control 86 of the Bowden type in the apparatus shown in the drawings. The end of the pointer 84 moves in front of a graduated scale 85 situated at a suitable part of the base of the apparatus and indicates the height of the head 82 above the plate 1. It will thus be understood that, when the foot to be measured is resting on the plate 1, the rod 81, which is urged upwards by its spring, is applied against the arch of the foot, and that the pointer 84 indicates the height of the corresponding point of the arch of the foot.

In an exactly similar way, the point N, as defined in Figure 1, is determined by means of a bar 87 which corresponds to one-sixth of the angle α, by means of a cursor 88 adapted to slide on this bar and which is rigidly fixed to the common axis of articulation of the two lozenges of the second half of the pantograph, as described above. To this end, it will suffice to dimension the members of the pantograph in such a manner that the distance of the cursor 88 from the fixed spindle 73 is half the distance of the said cursor from the spindle 74 of the cursor 75 which slides on the bar 55.

The variations in angular position of the various bars are sufficiently small to assume, for the requirements of ordinary use, that the arcs and the chords which subtend them are equal in length.

The bar 87 is also provided with a slot 91 in which slides a swivel 92 which slides at the same time in the slot 76 of the arm 29 of the cursor 34. The swivel 92 thus corresponds to the position of the point N of Fig. 1, and it is provided with a spring-loaded rod which also passes through the opening 83 and which is constructed in the same way as the rod 82 which serves in the determination of the point M. This rod is coupled by a control 93 to a pointer 94, the point of which moves in front of a graduated scale 95. The height of the point N of the arch of the foot may thus be read-off on the scale 95.

At the beginning of the present description, it has also been stated that it would be an advantage to know the height of the first cuneiform bone which is located on the upper face of the foot, half-way along its length, and also the height of the point of the upper face of the foot which is situated at two-thirds of its length starting from the rear face of the heel. A measurement of the height of these two points is obtained by using the devices 111 and 112, which are similar to scribing gauges and which are respectively carried by the cursor 33 and a further cursor 11, which is in screw engagement with the threaded part 10 of the main control rod 5 which has a pitch of same hand as that of the threaded part 5 and equal to ⅔ of the same (e. g. 400 hundredths of one millimetre). Graduations 114 and 115 enable the heights of the two points in question to be indicated. In addition, the device 112 may be adjusted with respect to the cursor 113 in two directions at right angles to each other in the horizontal plane, by means of two dove-tail slides such as the slide 116 which is shown on Figure 5. Two graduated scales 117, 118, enable these two perpendicular displacements to be indicated. The trolley which slides on the slide 116 carries a small plate 120 perpendicular to the plate 1 and intended to measure the location of the hallux valgus.

These scribing gauges may be provided with a feeler which moves laterally so as to measure the thickness of the foot at a number of points corresponding to the second, third, fourth or fifth metatarsal.

The operation of the apparatus which has been described above is as follows:

In the first place, it is desirable to state that when the weight of the body rests on the feet, the arches of the feet undergo a certain flattening action. In accordance with the data which it is desired to obtain, the apparatus is arranged so as to be utilised either flat for use in the standing position and to take account of the proportions of the foot in this positon, or in an inclined position with different degrees of inclination (by adjustment of the base) so as to take the measurements of the foot under a moderate pressure in order to obtain a good fitting of the shoe, for example.

To facilitate the placing of the feet in position on the apparatus, the feelers 51, 52, 53 and 54 are first opened out and the two cursors 8 and 14 are widely separated from each other by means of the crank-handle 7. The feet are then placed in position in such manner that the rear face of the heel is in contact with the raised edge 12 and the internal face of the foot is in contact with the raised edge 16 and the small plate 17. In the case of the hallux valgus, this may be measured by moving the cursor 120 laterally.

The crank-handle 7 is turned so as to bring the cursor 8 in contact with the extremities of the big-toes. The total length L of the foot may then be read-off directly on the graduated scale 13 associated with the end of the said cursor, and this dimension gives the size. All the other cursors will then be automatically located at the positions corresponding to the desired fractions of the length L by virtue of the mechanical design of the device, as described above. Without any further operation, the height of the two points M and N of the arch of the foot may be read-off directly on the graduated scales 85 and 95.

The two sets of feelers 51, 52, 53 and 54 are then brought into contact with the external surface of the feet. The width of each of the two feet, at the different points with which the feelers are in contact, may then be directly read on the graduated scales in front of which move the pointers 102, 107, 108 and 109. It will be simple to measure, by any suitable known means, the perimeter of the foot at the desired points by using these feelers as a guide.

Finally, the two scribing-gauges 111 and 112 are lowered until they come into contact with the upper surface of the foot, and the corresponding heights of these two points may then be read directly from the graduated scales 114 and 115.

In conclusion, it will be seen that, whatever may be the length of the foot and whatever its shape may be, there is immediately obtained the measurement of the widths and the heights of the foot at the characteristic positions of its anatomy, such as defined above. It is clear that an apparatus of this kind, the use of which is strikingly simple, enables precise indications to be obtained as to the shape and the dimensions of the foot, and this in a wholly automatic manner.

To sum up, the apparatus which has been described in the foregoing, enables measurement to be made with a high degree of accuracy as follows:

(1) The real length of the foot
    (a) When free from weight,
    (b) When supporting weight;
(2) The width of the foot at a number of important points
(3) (without any implied limitation)
    (a) Along its internal edge,
        (I) At the level of the metatarso-phalangeal joint of the big toe,
        (II) At the level of half the length of the foot,
        (III) At the level of the rear third,
        (IV) At the level of the rear fifth.
    (b) Along its external edge,
        (I) At the level of the metatarso-phalangeal joint of the fifth toe,
        (II) At the level of half the length of the foot,
        (III) At the level of the rear third,
        (IV) At the level of the rear fifth.
    (c) For the case of the hallux valgus (deformation of the big toe)
        (I) By virtue of the lateral movement of the inside feeler located at this point, to determine the exact value of the lateral protuberance of the hallux valgus;
        (II) By means of the scribing-gauge located at this same level, the upward protuberance of the hallux valgus is measured.
    (d) In the case of the quintus varus (deformation of the fifth toe), the protuberance of the metatarso-phalangeal joint of the fifth toe is measured by means of the outside feeler located at this level.
(4) The thickness of the foot,
    (a) At the level of the front two-thirds of the length of the foot,
    (b) At the level of half the length. These measurements are not to be taken in any limiting sense, but they are sufficient to determine by direct reading on the scribing-gauges, at the same time as the height of the foot, the angle of the upper face of the foot.
(5) The exact value of the heights of the arch of the foot by means of the lower feelers (of which there may be any desired number).

The above essential measurements enable a complete study of the foot to be made by establishing by direct reading, amongst other dimensions, the following:

1—Its length;
2—Its widths and their proportions;
3—The angle of the rectangular trapezium in which the foot can be included;
4—The angle of the upper part of the foot, either along the path of the central bisector, or at any other point;
5—The measurements of the perimeters and, in consequence, the volumetric measurements of the foot;
6—The principal features of the foot enabling the determination, amongst other features;

(a) Whether the foot is normal;
    (b) If the arch has fallen and in what proportion with respect to a normal foot, this proportion being determined with absolute precision;
    (c) If the camber of the foot is excessive and, with precision, in what proportion with respect to the normal foot;
    (d) The elongation or the shortening of the foot as a function of the falling of the arch or the excessive amount of camber;
    (e) The exact proportions between the length and the width;
    (f) The proportions as between the widths themselves;
    (g) The more or less pronounced spreading of the front transverse arch of the foot;
    (h) A comparison of the various angles;
    (i) The proportions of the lengths of the foot, the front span of the longitudinal arches (internal and external measurement) etc.

The graduations of the apparatus which are given either in degrees or in "grades," either in millimeters or in inches, make it universal. The apparatus may be designed in a large number of forms from the most simple (a caliper slide-gauge with lateral members sliding lengthwise and transversely) up to the most complicated form, giving a direct reading with a simple operation, and may be applied to a study of the human foot in all the fields of its application; anatomy, physiology, standardisation of footwear, taking measurements, study of shapes, etc.

It will, of course, be understood that the invention is in no way limited to the forms of embodiment described and shown; numerous alternative forms will be readily apparent to those skilled in the art, depending on the applications considered, and without thereby departing from the spirit or the scope of the present invention.

What I claim is:

1. A foot measuring apparatus comprising a foot receiving base, an abutment fixedly carried on said base and extending normally with respect thereto for engagement by the rear face of the heel of the foot to be measured, a toe slider movable to-and-fro relative to said base towards and away from said abutment, operating means operatively connected to said toe slider for moving the same into engagement with the tip of the big toe of the foot to be measured, at least one auxiliary slider also movable to-and-fro relative to said base towards and away from the plane of said abutment between said plane and the plane of said toe slider, means operatively connected to said operating means for moving said auxiliary slider in such a manner that the ratio of the distances between said abutment on one hand, and said toe slider and said auxiliary slider respectively, on the other hand, has a constant predetermined value regardless of the position of said toe slider with respect to said abutment, a transverse slider carried by said auxiliary slider and movable transversely of the direction of movement of said auxiliary slider, a lateral foot-engaging feeler carried by said transverse slider and adapted to be brought into contact with the lateral face of the foot to be measured, first indicating means carried by said base and cooperating with said toe slider for indicating the position of said toe slider on said base, and second indicating means cooperating with said transverse slider for indicating the position of said lateral feeler with respect to said base.

2. An apparatus as defined in claim 1, furthermore comprising a longitudinal reference abutment against which the inner face of the foot to be measured is to be applied.

3. An apparatus as defined in claim 1, wherein two auxiliary sliders are provided, the variable distances between each of said two sliders and said abutment being respectively one fifth and three fifths of the variable distance between said toe slider and said abutment, whereby a measure is obtained of the width of the foot to be measured at two predetermined locations of the length thereof namely, one fifth (point where the heel rests on the ground) and three fifths (metatarso-phalangeal articulation) thereof from the rear face of the heel.

4. An apparatus as defined in claim 1, furthermore comprising at least one ancillary slider also movable to-and-fro relative to said base toward and away from the plane of said abutment between said plane and the plane of said toe slider, means operatively connected to said ancillary slider for moving the same in such a manner that the ratio of the distances between said abutment on one hand, and said toe slider and said ancillary slider respectively, on the other hand, has a constant predetermined value regardless of the position of said toe slider with respect to said abutment, and means carried by said ancillary slider and movable toward and away from said base for engagement with the upper face of the foot.

5. An apparatus as defined in claim 4, comprising two ancillary sliders located at variable distances from said abutment respectively equal to one-half and two-thirds of the variable distance between said abutment and toe slider.

6. An apparatus as defined in claim 1, wherein at least one of said auxiliary sliders carries an upwardly movabe feeler adapted to measure the thickness of the foot.

7. An apparatus as claimed in claim 5, wherein said ancillary slider spaced from said abutment by a variable distance equal to two-thirds of the variable distance between said abutment and toe slider carries an upwardly movable feeler adapted to measure the thickness of the foot above the hallux valgus region.

8. An apparatus as claimed in claim 7, wherein said feeler is furthermore adjustable in two right-angled directions on said ancillary slider to permit determining the exact location and volume of an hallux valgus.

9. An apparatus as defined in claim 1, wherein said auxiliary slider is located at a variable distance from said abutment equal to one-third of the variable distance between said abutment and toe slider and wherein said laterally adjustable feeler is connected with two upwardly adjustable feelers through a linkage adapted to keep said upwardly adjustable feelers at distances from the internal face of the foot respectively equal to one-sixth and one-half of the width of the foot as measured by said laterally adjustable feeler.

10. An apparatus as defined in claim 9, wherein said linkage is constituted by screws of suitable differential pitches cooperating with nut members integral with said sliders and rotated at equal speeds from appropriate control means.

11. A foot measuring apparatus comprising a foot receiving base, a longitudinal abutment on said base in a plane extending normally to said base for engagement by the inner face of the foot to be measured, a toe slider movable to-and-fro relative to said base towards and away from said abutment, a transverse abutment on said base in a plane extending normally to said base for engagement by the rear face of the foot to be measured, operating means operatively connected to said toe slider for moving the same into engagement with the tip of the big toe of the foot to be measured, a pivot the axis of which extends normally to said base, said pivot being mounted for to-and-fro movement in the plane of said longitudinal abutment, on the side of said transverse abutment opposite the side of said toe slider, means for moving said pivot so designed and arranged that the distance between said pivot and said transverse abutment is permanently equal to the distance between said toe slider and said transverse abutment, a pivoting bar pivotally mounted on said pivot, at least one auxiliary slider movable to-and-fro relative to said base toward and away from the plane of said transverse abutment between said plane and the plane of said toe slider, means operatively connected to said operating means for moving said auxiliary slider in such a manner that the distances between said transverse abutment on one hand and said toe slider and said auxiliary slider respectively, on the other hand, has a constant predetermined value regardless of the position of said toe slider with respect to said transverse abutment, at least one feeler located in the transverse plane containing said auxiliary slider and operatively connected both with said auxiliary slider and said pivoting bar and adapted to be brought into engagement with the outer face of the foot to be measured, and indicating means operatively connected to said pivoting bar for indicating the angle between said bar and the plane of said longitudinal abutment.

12. An apparatus according to claim 11, wherein said auxiliary slider is located at a variable distance from said abutment equal to one-third of the variable distance between said abutment, the apparatus further comprising at least two other bars pivoted on the same pivot as said pivoting bar and two upwardly adjustable feelers each slidably mounted both on one of said other bars and on a transverse member of said auxiliary slider, said three pivoting bars being interconnected through a linkage adapted to keep the variable angles between said other bars and the longitudinal axis of the apparatus, respectively equal to one-sixth and one-half of the angle between said axis and said pivoting bar.

References Cited in the file of this patent

UNITED STATES PATENTS

| | | |
|---|---|---|
| 1,792,892 | Cobb et al. | Feb. 17, 1931 |
| 2,657,463 | Spencer | Nov. 3, 1953 |
| 2,696,051 | Perman et al. | Dec. 7, 1954 |
| 2,706,856 | Cwiak et al. | Apr. 26, 1955 |